(12) United States Patent
Loseke

(10) Patent No.: US 6,449,244 B1
(45) Date of Patent: Sep. 10, 2002

(54) IMPLEMENTATION OF ORTHOGONAL NARROWBAND CHANNELS IN A DIGITAL DEMODULATOR

(75) Inventor: Charlotte N. Loseke, Parlos Verdes Peninsula, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/307,696

(22) Filed: May 10, 1999

(51) Int. Cl.[7] ............................. H04L 5/06; H04B 7/24
(52) U.S. Cl. ................... 370/208; 375/342; 370/203; 370/316; 370/437; 370/543; 455/12.1
(58) Field of Search ................... 370/203, 210, 370/206, 204, 277, 315, 316, 322, 319, 320, 321, 329, 330, 336, 345, 442, 450, 468, 465, 481, 497, 498, 503, 504, 516, 527, 535, 537, 542, 544; 375/219, 332, 222, 334, 269, 279, 203, 280, 326; 455/427, 3.01, 3.02, 293

(56) References Cited

U.S. PATENT DOCUMENTS

| | | | | |
|---|---|---|---|---|
| 5,537,435 A | * | 7/1996 | Carney et al. | ............... 370/210 |
| 5,825,807 A | * | 10/1998 | Kumar | ........................ 370/203 |

OTHER PUBLICATIONS

Multirate Signal Processing, pp. 289–325, by Crochiere and Rabiner, published in 1983 by Prentice Hall, Englewood Cliffs, New Jersey.

Orthogonal Spacing for Narrowband Channels in the Advanced EHF Waveform, by Mark Maleski, published in 1997 by Booz–Allen & Hamilton, VA.

Narrowband Channel Group Multicahnnel and Multimode Demodulator, by Russel R. Rhodes, publis 1997 by MIT Lincoln Lab, MA.

\* cited by examiner

*Primary Examiner*—Dang Ton
*Assistant Examiner*—Henry Baron
(74) *Attorney, Agent, or Firm*—Antonelli, Terry, Stout & Kraus, LLP

(57) ABSTRACT

An innovative channelizer design methodology is provided to adjust the narrowband channel frequency spacing and processing algorithm in order to develop a configurable multi-rate channelizer (20) for multiple applications with different input data rates and input channel group bandwidths. Given an input and output sampling rate and the input channel group bandwidth, the input channel spacing, the discrete Fourier transform (DFT) size, the valid output DFT bins, the dead zone implementation including the number of samples to blank for each chip, which exact samples to blank, the timing error immunity versus performance degradation balance may be derived to design hardware implementation of a configurable multi-rate channelizer for use in applications with different input data rates and input channel group bandwidths. Using the innovative multi-rate channelizer design, a single configurable channelizer may be obtained and can be usable for multiple applications in different channelization modes of operation while realizing design gate savings.

30 Claims, 8 Drawing Sheets

FIG. 5

| | VALUE AT MODULATOR TRANSITION |
|---|---|
| 0, 1 | |
| 16–26 | 21.5 |
| 98–108 | 103.8 |
| 180–190 | 186.1 |
| 262–272 | 268.4 |
| 344–354 | 350.7 |
| 426–436 | 433 |
| 509–519 | 515.3 |
| 591–602 | 597.6 |
| 673–684 | 679.9 |
| 755–766 | 762.2 |
| 837–848 | 844.5 |
| 921–931 | 926.8 |
| 1003–1013 | 1009.1 |
| 1085–1095 | 1091.4 |
| 1167–1177 | 1173.7 |
| 1249–1255 | 1256 |

IMPLEMENTATION OF ORTHOGONAL NARROWBAND CHANNELS IN A DIGITAL DEMODULATOR

BACKGROUND OF THE INVENTION

1. Technical Field

The present invention relates to implementations of orthogonal narrowband channels in a digital demodulator, and more particularly, relates to a methodology to adapt a multi-rate processing algorithm and channel spacing of an existing channelizer design for implementation of orthogonal narrowband channels of different input data rates and input channel group bandwidths.

2. Related Art

Generally, multi-channel wireless communication systems such as satellite communication systems may contain a certain number of transponders for communications over a broad geographical area. Each transponder may be a receiver-transmitter pair. The receiver of a satellite system may be a wideband receiver that may cover a wide range of communication frequencies within an available multi-channel bandwidth. The range of communication frequencies may depend on the number of channels the satellite communication systems can handle. Channelizers may be used to separate an input wideband signal of a specific spectrum received from an antenna into a plurality of narrower band channels for further processing. The wideband signal may carry different channels using different frequency bands, different time slots, different spread spectrum coding, or a combination of any two or more of these techniques. The channelizers may be considered as wideband channelizers and/or narrowband channelizers used to separate an input wideband signal into smaller sections of constituent channels. The term "wideband" may not be limited to any particular spectral range. Rather, wideband may imply a spectral coverage of at least the useful communication range over which the multi-channel wireless communications system may operate. Narrowband may, on the other hand, imply only a portion of the spectrum, for example, the width of an individual channel. Narrowband channels may be referred to as subchannels of a channel group. For example, a 15 MHz channel group may contain 50 narrowband channels each with a 300 kHz bandwidth. Many channelizers may operate on radio frequency (RF) or baseband, analog or digital signals.

Typically, multiple levels of channelization are required to access the data in the narrowband channels. However, the channelizers are typically designed for a specific channel group bandwidth and data rate set that depends on the arrangement of the prior levels of channelization. Several methodologies for typical channelizer designs are known. For example, theoretical basis for such a channelizer design is described in "*Multirate Digital Signal Processing*" by R. E. Crochiere and Rabiner, published in 1983 by Prentice Hall, Englewood Cliffs, N.J., which publication is incorporated herein by reference in its entirety. Theoretical basis for multichannel demodulator designs is provided in "*Narrowband Channel Group Multichannel and Multimode Demodulator*" by Russell R. Rhodes and Dean P. Kolba, published in August 1997 by MIT Lincoln Laboratory. Additional basis for orthogonal narrowband channel spacing of such demodulator designs is described in "*Orthogonal Spacing For Narrowband Channels In The Advanced EHF Waveform*" by Mark Maleski et al., published in September 1997 by Booz-Allen & Hamilton. However, many contemporary channelizer designs are afflicted with considerable design constraints. Examples of the design constraints may include the following: the input data rate must be the same as the input channel bandwidth; the discrete Fourier transform (DFT) size must be the same as the number of valid output channels; and the input bandwidth must be full with valid channels. Moreover, once a channelizer design is realized for a specific channel group bandwidth and data rate set, such a channelizer may not be reconfigured and/or adapted for operations with different input data rates and input channel group bandwidths. Consequently, contemporary methodology for typical channelizers is not flexible for use in multiple data rate applications. Accordingly, there is a need for a uniform and reliable methodology used to adapt a multi-rate processing algorithm and channel spacing of a channelizer design and to develop a channelizer architecture for implementation of orthogonal narrowband channels of different input data rates and input channel group bandwidths. Such a methodology must be flexible and maintain the ability to reconfigure channelization process to account for changes in channel layout and data rate.

SUMMARY OF THE INVENTION

In accordance with the present invention, an innovative channelizer design methodology is provided to design a single orthogonal channelizer for implementation of orthogonal narrowband channels of different input data rates. The channelizer design methodology includes obtaining information relating to an input sampling rate, an input channel group bandwidth, a number chips per hop which varies in accordance with a modulation mode, a hop time and a valid symbol time per hop of an input signal; calculating an output sampling rate of the input signal based on the number chips per hop and the valid symbol time per hop; calculating a number samples per chip based on the input sampling rate and the output sampling rate, and a number samples per hop based on the input sampling rate and the hop time, respectively; determining a discrete Fourier transform (DFT) size less than the number samples per chip; calculating a channel spacing of the input signal based on the input sampling rate and the discrete Fourier transform (DFT) size; determining a number of valid output channels of the input signal based on the input channel group bandwidth and the channel spacing; determining a number of data samples of the input signal and which data samples are to be blanked on either side of a chip boundary based on the number samples per hop and the number chips per hop; and determining a:circular shift value based on the sample number modulo the discrete Fourier transform (DFT) size, where the sample number is from zero to the number samples per hop minus one.

The number of data samples of an input signal to be blanked, the circular shift value, and the discrete Fourier transform (DFT) size are then used to construct a single orthogonal channelizer comprising a blanking filter and cyclic shift block which performs sample blanking operations in accordance with the number of data samples of said input signal to be blanked, and phase shift operations in accordance with the circular shift value, and a discrete Fourier transform (DFT) block which performs discrete Fourier transform (DFT) computations in accordance with the DFT size. The single orthogonal channelizer obtained using the innovative channelizer design methodology of the present invention is provided for efficiently servicing multiple input data rates with minimal additional hardware for reconfiguration while realizing design hardware savings. The configurable orthogonal channelizer may be implemented with an efficient hardware architecture using blanking filter, cyclic shift and discrete Fourier transform techniques to separate an input signal of different channel group bandwidths into a plurality of individual channels at different data rates. The orthogonal channelizer can be configurable to separate data samples of an input signal into a first plurality of individual channel(s) with a spacing of a bandwidth frequency of the input signal at a first data rate using sample blanking operations, cyclic shift operations and discrete Fourier transform (DFT) computations, when a selected mode of channelization corresponds to the first data rate. Similarly, the single orthogonal channelizer can also be configurable to separate data samples of the input signal into a second plurality of individual channel(s) with a spacing of twice a bandwidth frequency of the input signal at a second data rate using sample blanking operations, cyclic shift operations and selected discrete Fourier transform (DFT) computations, when a selected mode of channelization corresponds to the second data rate. Likewise, the single orthogonal channelizer can further be configurable to separate data samples of said input signal into a third plurality of individual channel(s) with a spacing of four times a bandwidth frequency of the input signal at a third data rate using sample blanking operations, cyclic shift operations arid selected discrete Fourier transform (DFT) computations, when a selected mode of channelization corresponds to the third data rate.

In accordance with another aspect of the present invention, a configurable orthogonal channelizer obtained using the innovative channelizer design methodology is provided with a blanking filter and cyclic shift block comprising memory devices and serial-to-parallel registers, arranged in parallel to receive successive sets of data samples of an input signal of an input sampling rate, which performs blanking operations in which a predetermined number of data samples on either side of a modulator transition are blanked for guard time, and which performs phase shift operations in accordance with a number of shifts determined by (sample number)*modulo (DFT size), where a sample number from zero to the total number samples per hop to produce phase adjusted outputs; and a discrete Fourier transform (DFT) block arranged in parallel to receive respective ones of the phase adjusted outputs, which performs discrete Fourier transform (DFT) computations to produce individual channels at a different data rate.

The blanking filter and cyclic shift block may contain a first memory device which receives a sequence of real data for sample processing; a second memory device which receives a sequence of imaginary data for sample processing; a first serial-to-parallel register which passes processed samples of cyclically shifted real data from the first memory device as parallel sample outputs while discarding blanked samples; a second serial-to-parallel register which passes processed samples of cyclically shifted imaginary data from the second memory device as parallel sample outputs while discarding blanked samples; and a control logic block which incorporates blanking and cyclic shifting when addressing and retrieving real and imaginary data input from the first and second memory devices respectively.

The discrete Fourier transform (DFT) block may contain multiplexers for arranging the complex data according to the DFT size so that the input and the output ordering of the DFT points will be corrected; first 4-point discrete Fourier transform (DFT) units, arranged to receive respective ones of phase adjusted outputs of real data, which perform 4-point transformations to produce first transform outputs of complex data; second 4-point discrete Fourier transform (DFT) units, arranged to receive respective ones of the phase adjusted outputs of imaginary data, which perform 4-point transformations to produce second transform outputs of complex data; first combine 4-point discrete Fourier transform (DFT) units, arranged to receive respective ones of the first transform outputs of complex data, which combine 4-point transformations to produce first combined outputs of complex data; second combine 4-point discrete Fourier transform (DFT) units, arranged to receive respective ones of the second transform outputs of complex data, which combine 4-point transformations to produce second combined outputs of complex data; and combine 8-point discrete Fourier transform (DFT) units, arranged to receive the first and second combined outputs of the complex data to produce individual channels of interest.

In accordance with yet another aspect of the present invention, a configurable orthogonal channelizer obtained using the innovative channelizer design methodology is provided with a plurality of memory devices and serial-to-parallel registers, a plurality of multiplexers, and a plurality of discrete Fourier transform (DFT) units arranged in parallel to perform sample blanking and phase shift operations and discrete Fourier transform (DFT) computations to separate an input signal into individual channels with a channel spacing of a bandwidth frequency at a 1×data rate, when a selected mode of channelization indicates the 1×data rate. However, when the selected mode of channelization indicates a 2×data rate, first selected ones of the discrete Fourier transform (DFT) units are bypassed while other hardware implementations operate together to separate data samples of an input signal into individual channels with a spacing of twice the bandwidth frequency at the 2×data rate. Likewise, when the selected mode of channelization indicates a 4×data rate, second selected ones of the discrete Fourier transform (DFT) units are bypassed while other hardware implementations operate together to separate data samples of an input signal into individual channels with a spacing of four times the bandwidth frequency at the 4×data rate.

The memory devices may be used to receive a sequence of real and imaginary data of the input signal for sample processing. The serial-to-parallel registers may be used to pass processed samples of cyclically shifted real and imaginary data of the input signal from the memory devices as parallel sample outputs while discarding blanked samples.

The multiplexers may be arranged in parallel to receive respective ones of the parallel sample outputs of cyclically shifted real and imaginary data of the input signal, which shuffle the data to achieve correct ordering at the input to the DFT in accordance with the DFT size chosen, which is in accordance with the data rate of the output channels.

The discrete Fourier transform (DFT) units may contain first 4-point discrete Fourier transform (DFT) units, arranged to receive respective ones of phase adjusted outputs of real data, which perform 4-point transformations to produce first transform outputs of complex data; second 4-point discrete Fourier transform (DFT) units, arranged to receive respective ones of the phase adjusted outputs of complex data, which perform 4-point transformations to produce second transform outputs of complex data; first combine 4-point discrete Fourier transform (DFT) units, arranged to receive respective ones of the first transform outputs of complex data, which combine 4-point transformations to produce first combined outputs of complex data; second combine 4-point discrete Fourier transform (DFT) units, arranged to receive respective ones of the second transform outputs of complex data, which combine 4-point transformations to produce second combined outputs of complex data; and combine 8-point discrete Fourier transform (DFT) units, arranged to receive the first and second combined outputs of the complex (real and imaginary) data to produce individual channels of interest. The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 5 illustrates an example of the blanking process of an exemplary orthogonal channelizer for blanking an equal number of samples on either side of a modulator transition for guard time according to the principles of the present invention;

DETAILED DESCRIPTION OF EMBODIMENTS OF THE INVENTION

Figure 1:
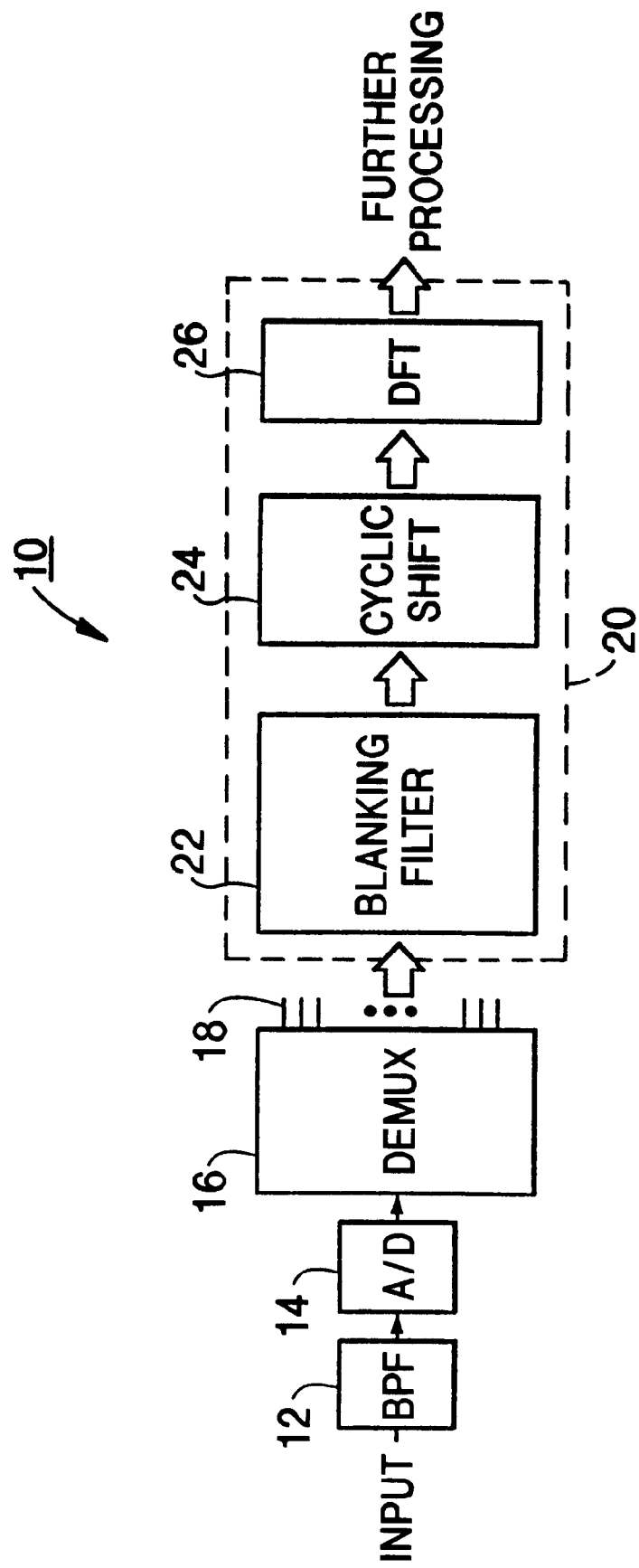
FIG. 1 illustrates a block diagram of major components of a receiver of a wireless communications system.

Referring to the drawings and particularly to FIG. 1 which illustrates a block diagram of major components of a receiver of a wireless communications system. Typically, an exemplary receiver of a wireless communications system may include a front end, down-conversion section (not shown) which intercepts electromagnetic radiation within the frequency band of interest, converts the intercepted electromagnetic radiation into an electrical signal, and then down-converts such an electrical signal into a baseband signal containing the contents of all communication channels currently operative in the communication system or network of interest. Several types of input devices may be used for intercepting or capturing electromagnetic radiation for subsequent input and down conversion in the exemplary receiver. Examples of such input devices may include antennas, waveguides, coaxial cables, optical fibers, or infrared frequency transducers.

As shown in FIG. 1, such an exemplary receiver may comprise a bandpass filter (BPF) 12, an analog-to-digital (A/D) converter 14, a demultiplexer (DEMUX) 16, and at least one orthogonal narrowband channelizer 20 and other types of signal processing circuits (not shown). The bandpass filter (BPF) 12 of a predetermined bandwidth is used to filter an input baseband signal and pass a wideband signal of a selected frequency spectrum. The selected frequency spectrum of interest may be 20 MHz including a plurality of available channels, but the present invention may not be limited to this frequency range. The A/D converter 14 samples the wideband signal to produce a digitized signal containing a plurality of channels (i.e., N channels). The digitized signal is represented in a series of digital samples. A serial stream of multiple bit word samples produced by the A/D converter 14 is inputted to the demultiplexer 16 which produces a plurality of multiplexed data outputs 18. The demultiplexer 16 functions as a multiple tapped delay line with each parallel output being outputted from a different tap of the delay line. The demultiplexed data outputs 18 of the demultiplexer 16 are applied to the orthogonal channelizer 20 constructed according to the principles of the present invention for separation (translation) into a plurality of narrowband signals, where each narrowband signal conveys one of the channels conveyed by the wideband signal. The demultiplexed data outputs 18 of the demultiplexer 16 may be converted from real to complex data representations by, for example, a tuner, filter, and down sampler (not shown) performing down conversion of a spread spectrum transmission. Each orthogonal channelizer design 20 may be implemented by several configurable hardware blocks including a blanking filter block 22, a cyclic shift block 24, and a discrete Fourier transform (DFT) block 26 which may use data sample blanking operations and discrete Fourier engines for purposes of receiving an input signal of an input sampling rate and an input channel group bandwidth and separating such an input signal into different sets of narrowband orthogonal signals of different data rates for subsequent processing, via other types of signal processing circuits.

A typical orthogonal channelizer designed according to the principles of the present invention may contain the same hardware blocks, such as the blanking filter block 22, the cyclic shift block 24 and the discrete Fourier transform (DFT) block 26 for channelizing both real and complex data representations of an input signal into individual channels. The input signal can be considered as the sum of complex exponentials characterized by equally spaced channels. The blanking filter block 22 and the cyclic shift block 24 may be combined as a single structure for sample blanking operations and phase adjustment operations. Separately, the blanking filter block 22 is used to process both real and complex data representations of an input signal using sample blanking operations in which an equal number of samples on either side of the modulator transition are blanked for guard time. The cyclic shift block 24 is used for phase adjustment of the sample outputs from the blanking filter block 22. The DFT block 26 is then used to transform the phase adjusted outputs from the cyclic shift block 24 into individual channel(s) at a different rate. However, only some of these hardware blocks may be used while some other hardware blocks may be bypassed depending on an output data rate chosen for an input wideband signal with minimal additional hardware for reconfiguration. This way a single orthogonal channelizer can be reusable for multiple applications of different input data rates and input channel group bandwidths while realizing design gate savings.

An innovative channelizer design methodology according to the present invention is used to adapt the algorithm and channel spacing for a channelizer design to implement narrowband orthogonal channels for any input data rate and input channel group bandwidth. Given an input and output sampling rate, an input channel group bandwidth, a modulation mode and a hop time, the following parameters of a channelizer design may be derived as follows:

1. Channel spacing—must be arranged such that blanking makes the channels orthogonal;
2. Blanking—length of dead zone (dead zone is when samples are discarded); location of such blanking is pre-determined as the beginning and end of each chip;
3. Discrete Fourier transform (DFT) size;
4. Number of valid output channels (closely tied to channel spacing) and which DFT bins they correspond to;
5. Exact samples to blank—this has to do with the length of the data frame (or sub-frame) and the portion of the data frame (or sub-frame) used for communications, and the data rate (number of samples per chip); and
6. Circular shift details.

The time interval of interest is the time that allocated for the demodulator from a transmitter to process bits. The time interval may include an entire data frame (for a short, simple data frame) or part of a data frame (referred to as a sub-frame), and may be adjusted to a parameter depending on the data frame structure, the time interval in which the demodulator is expected to complete data processing, and whether or not there is any guard time in that interval. In another application, the data frame may be split into time intervals referred to as hops. A hop may then be a sub-frame as described above. The demodulator processes data on a per hop basis, which is assumed in the methodology described herein.

The innovative channelizer design methodology of the present invention has two major considerations. First, there is the greater immunity to timing error versus greater performance degradation from discarding information as the length of the dead zone increases. The second consideration relates to the numerology for an efficient implementation, including channel spacing, DFT size, dead zone, and number of output channels (which are related). Channel spacing and DFT size must be integers. A discrete Fourier transform (DFT) size that can be factored for efficient implementation may be preferred.

First, the following quantities are computed as follows:

samples per chip=input sampling rate/chipping rate;

chipping rate=#chips per hop/valid symbol time per hop;

dead zone=#samples per chip−#samples processed per chip;

and samples processed per chip=DFT size.

Then, the dead zone is determined based on how much loss can be tolerated:

Dead zone loss (dB)=10 log (DFT size/#samples per chip).

It is noted here that the dead zone loss depends on DFT size. Thus, the numerology of the implementations and what is realistic to implement in hardware also plays a role, and requires iteration in the design.

Next, the DFT size is determined:

DFT size=input sampling rate/channel spacing.

The DFT size and channel spacing both need to be integers. DFT sizes that are multiples of 3, 4, or 5, especially if they can be broken down into small factors are preferred for ease of implementation.

The channel spacing and channel count are determined from the following relationships:

Channel spacing=#samples per chip/(#samples processed per chip * chip duration);

valid output channels=input channel group bandwidth/channel spacing.

This is approximate because the input channel group bandwidth is less than the input sampling rate. To determine the exact number of valid output channels, draw out the frequency plan, centering the middle channel at zero (0), and see how the channel boundaries fall in relation to the channel group boundary.

Next, details of the blanking process need to be determined. First, determine the number of samples per hop and determine which samples (if any) are part of the guard band and therefore not processed. Then, determine where the chip boundaries, or modulator transitions are located. A fractional number of samples per chip is allowed; the boundary will be in the middle of a sample but that sample will be blanked.

Denote which samples around the chip boundary will be blanked (this was calculated as the dead zone). Approximately the same number of samples on either side of the chip boundary should be blanked. Check to make sure that each chip has the same number of processed (non-blanked) samples.

Finally, as part of the DFT channelization process, the circular shift details are determined as follow:

Circular shift=(sample number) modulo (DFT) size, where the sample number is from 0 to # of processed samples per hop minus one (−1).

Figure 2:
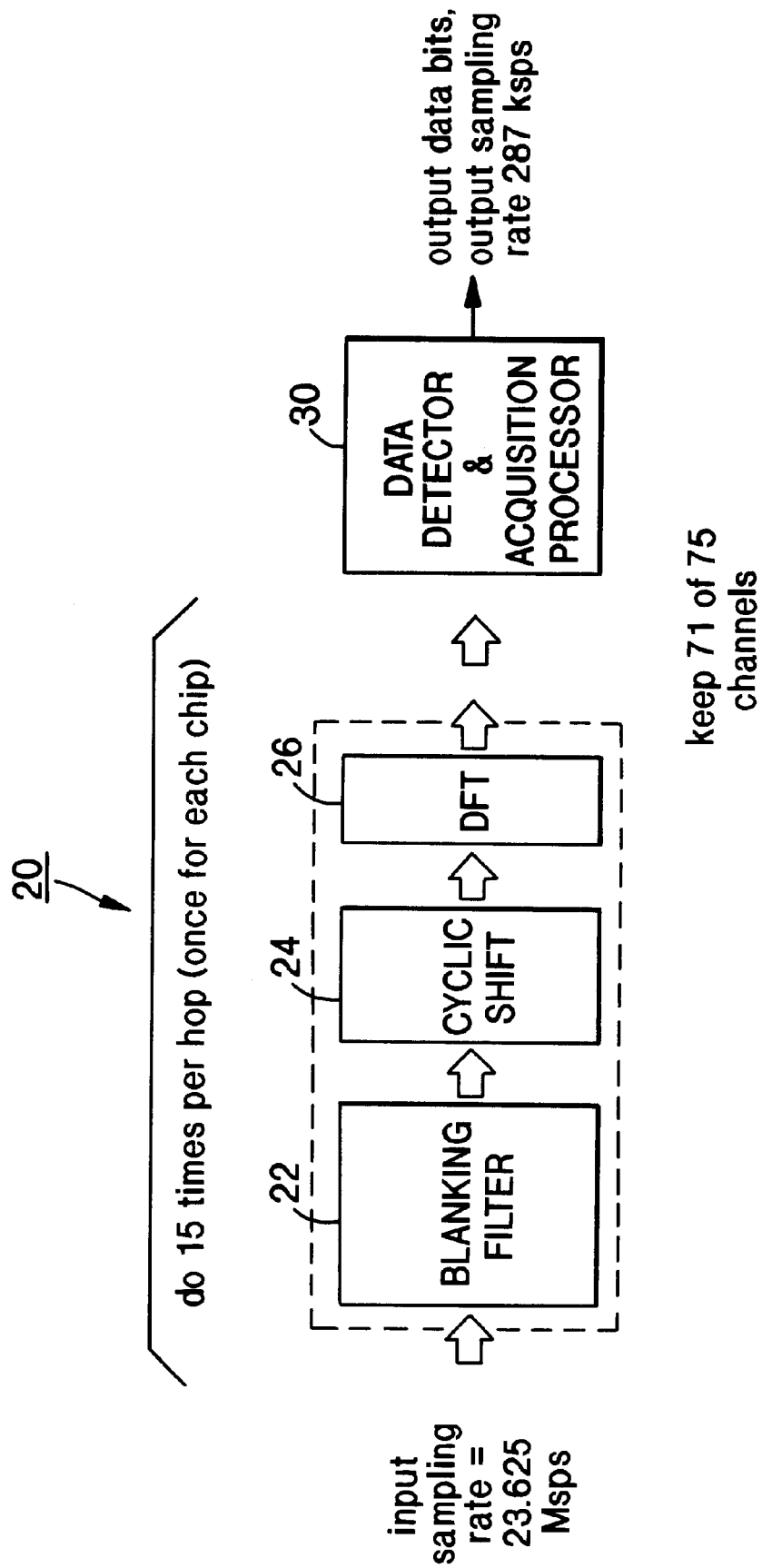
FIG. 2 illustrates a block level diagram of an exemplary orthogonal channelizer operable to separate an input signal into individual channels according to the principles of the present invention.

An example of an orthogonal channelizer design using the innovative methodology according to the present invention is illustrated in FIG. 2. A typical orthogonal channelizer may be designed for a single rate application if key parameters such as an input data (sampling) rate, an output data (sampling) rate, a modulation mode, a hop time and a valid symbol time per hop are provided to such a channelizer design. For example, if an input sampling rate is provided as 23.625 MHz; an output sampling rate is provided as 287 kHz; a modulation mode is provided as 15 chips per hop (1 reference chip and 14 data chip) in symmetric differential phase shift keying (SDPSK) or symmetric differential quadriphase shift keying (SDQPSK); a hop time is provided as 53.2 $\mu$s; a valid symbol time per hop is provided as 52.3 $\mu$s. These key parameters are usually known prior to channelization. Given these parameters, the channel spacing, the DFT size, the valid output DFT bins, and the # of samples to blank for each chip can be derived using an innovative channelizer design methodology of the present invention as follows:

valid symbol time per hop 53.2 μs–52.3 μs=0.9 μs. In addition, since the number of samples per hop is provided as 1256 samples/hop, and the number of samples per chip is 1. Chipping rate = input sampling rate/#samples per chip
   = the output sampling rate
   = 287 kHz;
2. # samples per chip = input sampling rate/chipping rate
   = 23.625 MHz/287 kHz
   = 82.3 samples/chip;
2. Chip duration = 1/chipping rate
   = 1/287 kHz
   = 3.48 μs;
2. Desired dead zone loss < 1 dB, so that DFT size must be such that abs(10 $\log_{10}$ (DFT size/#samples per chip) < 1 dB. DFT size must be less than the #samples per chip. Based on the relationship with the dead zone loss, the DFT size chosen may be 75 since the 75 DFT size may be readily implemented;
3. Channel spacing = input sampling rate/DFT size
   = 23.625 Msps/75
   = 315 KHz;
2. Dead zone loss = 10 $\log_{10}$ (DFT size/#samples per chip)
   = 10 $\log_{10}$ (75/82.3)
   = 7 samples blanked per chip;
2. Dead zone = #samples per chip - #samples processed per chip
   = 82.3 - 75
   = 7.3 or approximately 7 samples blanked per chip;
2. # valid output channels = input channel group bandwidth/channel spacing
   = 22.365 MHz/315 kHz
   = 71;
2. # samples per hop = hop time * input sampling rate
   = 53.2 μs * 23.625 MHz
   = 1256 samples per hop;
2. Circular shift value = (sample #) modulo (DFT size)
   = (sample #) modulo 75, where sample # is from 0 to 1256.

As shown in FIG. 2, a typical orthogonal channelizer 20 using the innovative channelizer design methodology of the present invention comprises a blanking filter block 22, a cyclic shift block 24, and a 75-point DFT block 26. The blanking filter block 22 and the cyclic shift block 24 may be combined as a single structure for sample blanking operations and phase adjustment operations. Separately, the blanking filter block 22 is used to perform a 0.296 μs blanking process of an input signal of an input sampling rate of 23.625 MHz. The cyclic shift block 24 is used to perform a cyclic shifting of samples of filtered outputs from the blanking filter block 22 in accordance with a number of shifts determined. The DFT block 26 is used to perform 75-point DFT calculations. Additionally, data detector and acquisition processor 30 is included for further processing of individual channels output from the orthogonal channelizer.

Figure 3:
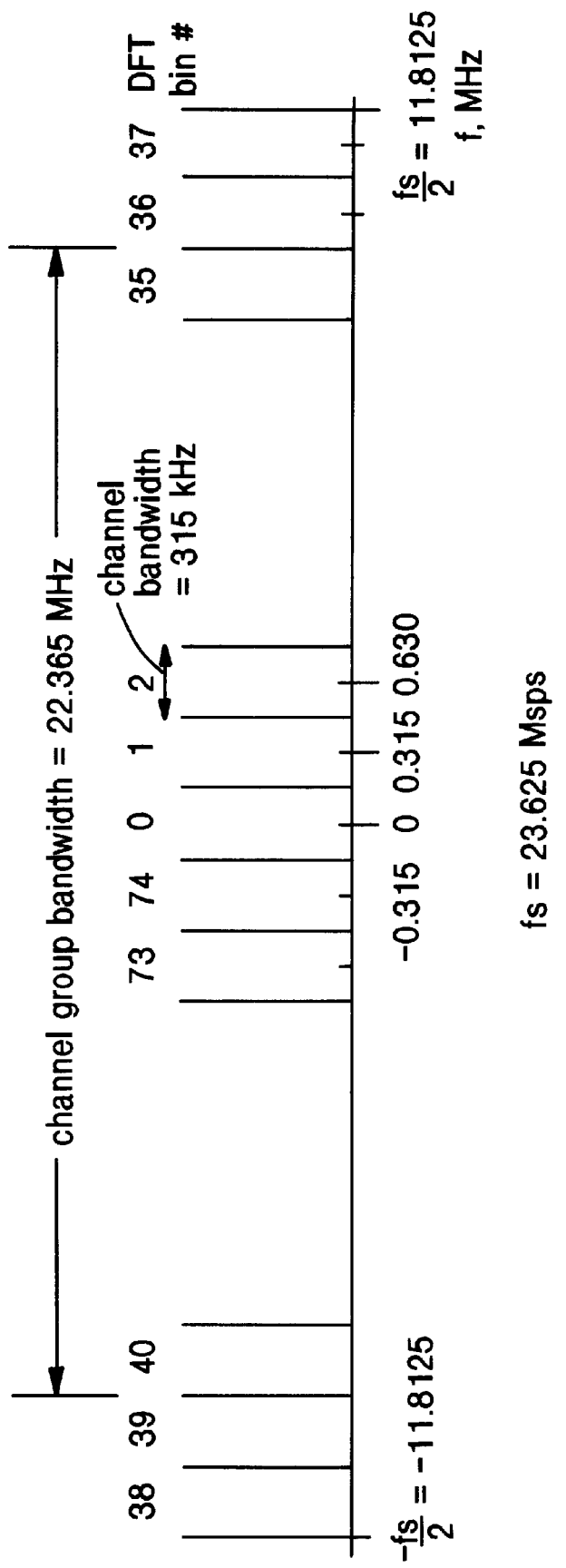
FIG. 3 illustrates a frequency plan and associated discrete Fourier transform (DFT) bins of an input channel group bandwidth of an exemplary orthogonal channelizer operable to separate an input wideband signal into individual channels according to the principles of the present invention.

FIG. 3 illustrates a frequency plan and associated discrete Fourier transform (DFT) bins of an input channel group bandwidth of the exemplary orthogonal channelizer 20 as shown in FIG. 2. As shown in FIG. 3, the input sampling rate (fs) is provided as 23.625 MHz; the channel group bandwidth is provided as 22.365 MHz; the channel spacing (bandwidth) is provided as 315 kHz; and the total valid output channels are provided as 71. Consequently, the DFT bins 0–35 and 40–74 contain valid channels.

Figure 4:
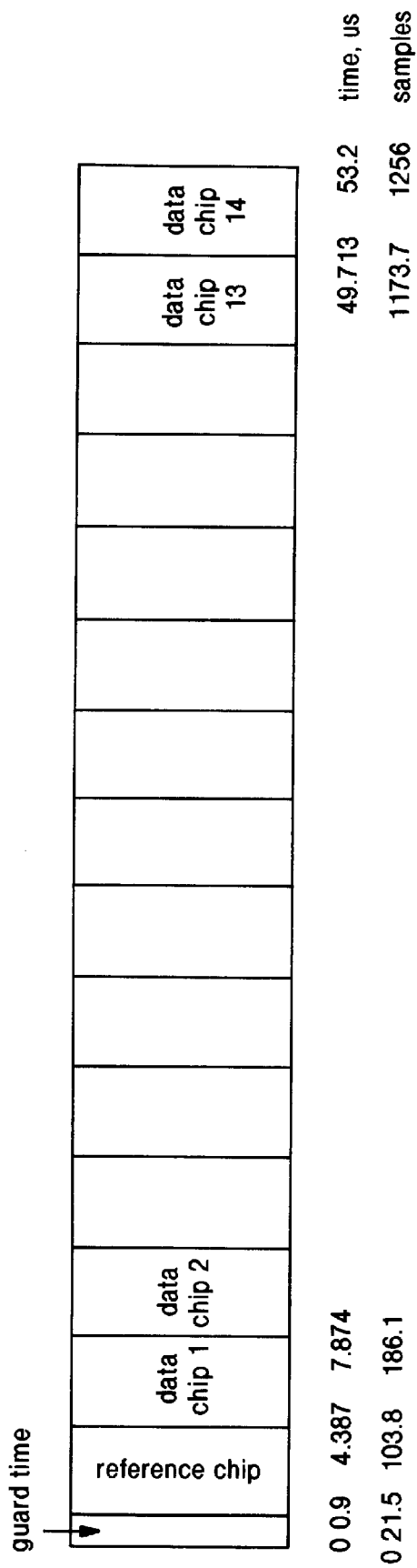
FIG. 4 illustrates a data frame of an exemplary orthogonal channelizer operable to separate an input wideband signal into individual channels according to the principles of the present invention.

FIG. 4 illustrates a data frame of the exemplary orthogonal channelizer as shown in FIG. 2. Each data frame contains 15 chips per hop including 1 reference chip and 14 data chips. A guard time is provided for data frame separation. Since the hop time is provided as 53.2 μs and the valid symbol time per hop is provided as 52.3 μs, the guard time is determined as the difference between the hop time and the provided as 82.3 samples/chip, the first 21.5 samples are blanked at the start of the hop by the blanking filter block 22 due to guard time. The number of samples blanked at the start of the hop of 21.5 is obtained from the difference between 1256 samples and (82.3 samples/chip)*(15 chips per hop).

FIG. 5 illustrates an example of the blanking process of the exemplary orthogonal channelizer as shown in FIG. 2. 1256 samples of the data frame per hop may be mapped in accordance with the values at modulator transitions as shown in FIG. 5. For example, the first modulator transition point may be set at 21.5 samples due to guard time. Next modulator transition points may be set as follows:

103.8 samples (21.5 samples+82.3 samples), 186.1 samples (103.8 samples+82.3 samples), 268.4 samples (186.1 samples+82.3 samples), 350.7 samples (268.4 samples+82.3 samples), 433 samples (350.7 samples+82.3 samples), 515.3 samples (433 samples+82.3 samples), 597.6 samples (515.3 samples+82.3 samples), 679.9 samples (597.6 samples+82.3 samples), 762.2 samples (679.9 samples+82.3 samples), 844.5 samples (762.2 samples+82.3 samples), 926.8 samples (844.5 samples+82.3 samples), 1009.1 samples (926.8 samples+82.3 samples), 1091.4 samples (1009.1 samples+82.3 samples), 1173.7 samples (1091.4 samples+82.3 samples), and 1256 samples (1173.7 samples+82.3 samples).

After all the modulator transition points are mapped, an equal number; of samples (shaded) on either side of the transitions are blanked. As shown in FIG. 5, the number of samples on either side of the transitions to be blanked is approximately 7 samples.

More importantly, the innovative channelizer design methodology of the present invention may also be used to design a configurable orthogonal channelizer for multi-rate applications to separate an input signal of an input sampling rate and an input channel group bandwidth into individual channels at different data rates as opposed to a single rate orthogonal channelizer as shown in FIG. 2. For purposes of illustration of a configurable multi-rate channelizer design, an output data (sampling) rate may be referred to, for example, as 1×, 2×, and 4×respectively. An input data (sampling) rate may be set, for example, at 120 Mgbits/second. If the operation of the configurable multi-rate orthogonal channelizer 20 may be set for 1×data rate mode, the output data rate of 6.424 Mgbits/second may be produced. If the operation of the multi-rate channelizer 20 may be set for 2×data rate mode, the output data rate of 12.85 Mgbits/second (twice faster than 1×mode) may be produced. Likewise, if the operation of the multi-rate channelizer 20 may be set for 4×data rate mode, the output data rate of 25.698 Mgbits/second (twice faster than 2×mode) may be produced. The configurable orthogonal channelizer 20 may be considered as a narrowband orthogonal channelizer for separating an input wideband signal to a number of smaller channels.

A channelization mode of operation may be set as 1×, 2×or 4×using, for example, register bits of a configuration word format for each channel in use. These register bits may be used to indicate either 1×, 2×or 4×channelization mode of operation. For example, two (2) register bits of a configuration word format may be represented as "00" for the 1×data rate, "01 " for the 2×data rate, and "11" for the 4×data rate for configuration of the multi-rate orthogonal channelizer hardware.

For 1×mode of operation, the configurable multi-rate orthogonal channelizer 20 may serve as a 1×orthogonal channelizer to separate an input wideband signal into a first set of sub-channels with a spacing of a bandwidth frequency (BW Hz). All processing hardware blocks, such as the blanking filter block 22, the cyclic shift block 24 and the DFT block 26 as shown in FIG. 1 may be used to produce sub-channels at 1×data rate.

For 2×mode of operation (twice faster than 1×mode), the configurable multi-rate orthogonal channelizer 20 may serve as a 2×orthogonal channelizer to separate an input wideband signal into a second set of sub-channels with a spacing of twice the bandwidth frequency (2*BW Hz). However, only some of these hardware blocks such as the blanking filter block 22, the cyclic shift block 24, and selected components of the discrete Fourier transform (DFT) block 26 may be used while other components of the discrete Fourier transform (DFT) block 26 may be bypassed to produce sub-channels at 2×data rate.

For 4×mode of operation (twice faster than 2×mode), the configurable multi-rate orthogonal channelizer 20 may serve as a 4×orthogonal channelizer to separate an input wideband signal into a third set of sub-channels with a spacing of four times the bandwidth frequency (4*BW Hz). Likewise, some of these hardware blocks such as the blanking filter block 22, the cyclic shift block 24, and selected components of the discrete Fourier transform (DFT) block 26 may be used while other components of the discrete Fourier transform (DFT) block 26 may be bypassed to produce sub-channels at 4×data rate. This way a single orthogonal channelizer can be reusable for multiple applications while realizing design gate savings.

Figure 6:
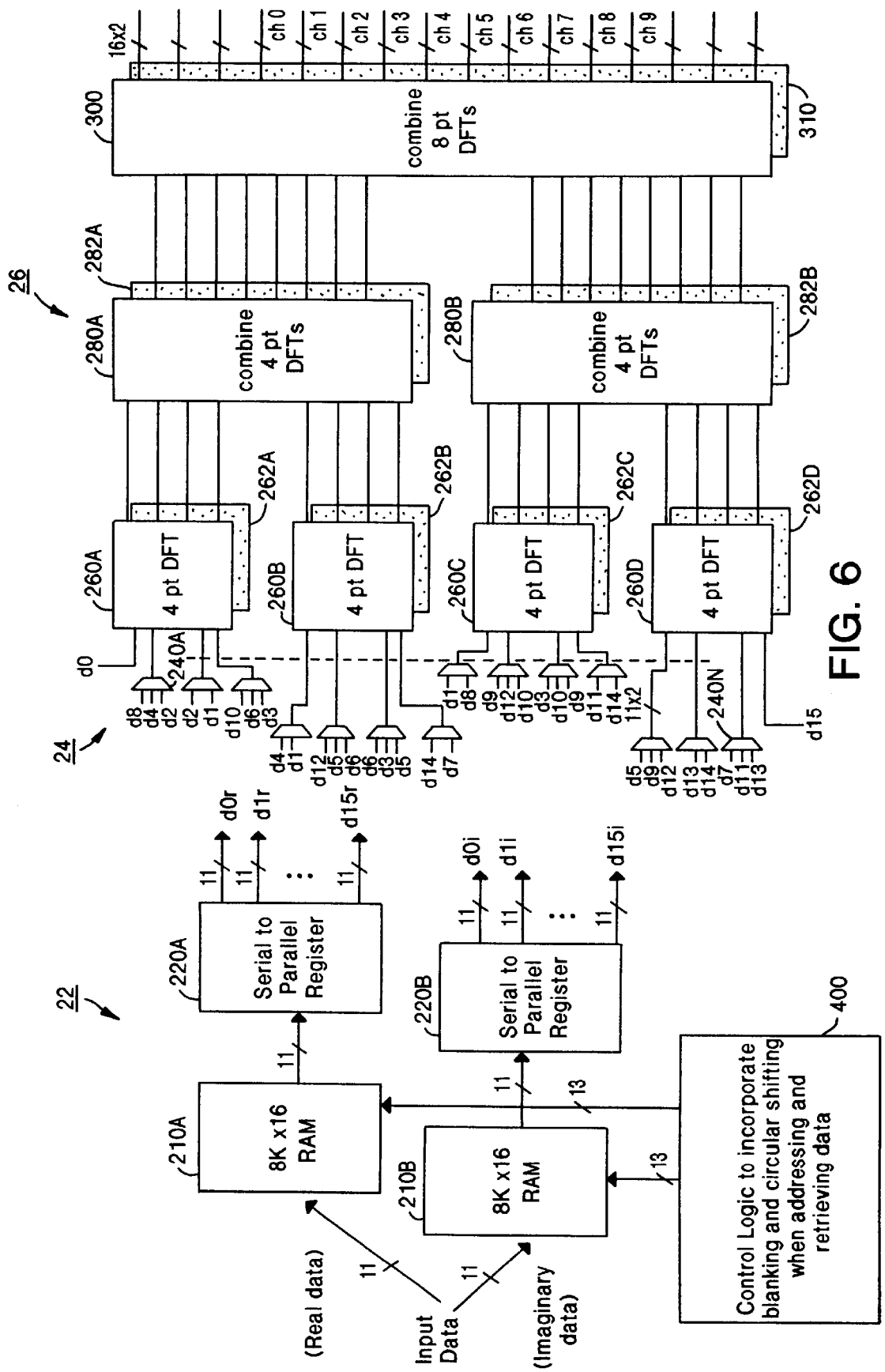
FIG. 6 illustrates a block level diagram of a configurable multi-rate orthogonal channelizer obtained using an innovative channelizer design methodology to separate an input wideband signal into individual channels at 1× data rate according to the principles of the present invention.

Turning now to FIG. 6 which illustrates a hardware implementation of a configurable multi-rate orthogonal channelizer 20 obtained using the innovative channelizer design methodology of the present invention for separating an input signal of an input spectrum into individual channels at 1×data rate. The 1×orthogonal channelizer 20 may begin with the general blanking filter block 22, the cyclic shift block 24, and the discrete Fourier transform (DFT) block 26. However, the specific hardware implementation of the blanking filter block 22, the cyclic shift block 24, and the discrete Fourier transform (DFT) block 26 depends upon the channel spacing, the DFT size, the valid output DFT bins, and the # of samples to blank for each chip given key input parameters.

For the 1×orthogonal channelizer 20, the key input parameters such as an input data (sampling) rate, an input channel group bandwidth, a modulation mode, a hop time and a valid symbol time per hop are provided as follows. Input sampling rate=120 MHz; output sampling rate=80 MHz; modulation mode=16+320 SDPSK (16 reference chips and 320 data chips per hop); hop time=53.2 $\mu$s; and valid symbol time per hop=52.3 $\mu$s. These key parameters are known prior to channelization. Given these key input parameters, the channel spacing, the DFT size, the valid output DFT bins, and the # of samples to blank for each chip is derived using the innovative channelizer design methodology according to the present invention as follows:

1. Chipping rate = #chips per hop/valid symbol time per hop
   = (16 + 320)/52.3 $\mu$s
   = 6.424 MHz
   = output sampling rate;
1. # samples per chip = input sampling rate/chipping rate
   = 120 MHz/6.424 MHz
   = 18.68 samples/chip;
1. Chip duration = 1/chipping rate
   = 1/6.424 MHz
   = 0.156 $\mu$s;
1. Desired dead zone loss < 1 dB, so that DFT size must be such that
   abs(10 $\log_{10}$ (DFT size/#samples per chip) < 1 dB which is abs(10 $\log_{10}$ (DFT -continued size/18.68) < 1 dB so 15 < DFT size < 18 (DFT size must be less than the #samples per chip). Based on the relationship with the dead zone loss, the DFT size chosen is 16 since the 16-point DFT may be readily implemented;

2. Channel spacing = input sampling rate/DFT size
= 120 MHz/16
= 7.5 MHz;
1. Dead zone loss = 10 $\log_{10}$ (DFT size/#samples per chip)
= 10 $\log_{10}$ (16/18.68)
= −0.67 dB;
1. Dead zone = #samples per chip − #samples processed per chip
= 18.68 − 16
= 2.68 samples blanked per chip;
1. # valid output channels = input channel group bandwidth/channel spacing
= 80 MHz/7.5 MHz
= 10.67 or approximately 10 valid output channels;
1. # samples per hop = hop time * input sampling rate
= 53.2 $\mu s$ * 120 MHz
= 6384 samples per hop;
1. Circular shift value = (sample #) modulo (DFT size)
= (sample #) modulo 16, where sample # is from 0 to 6383.

In addition, each data frame of the 1×modulation mode contains 336 chips per hop including 16 reference chips and 320 data chips. A guard time is provided for data frame separation. Since the hop time is provided as 53.2 $\mu s$ and the valid symbol time per hop is provided as 52.3 $\mu s$, the guard time is determined as the difference between the hop time and the valid symbol time per hop 53.2 $\mu s$−52.3 $\mu s$=0.9 $\mu s$. Further, since the number of samples per hop is provided as 6384 samples/hop, and the number of samples per chip is provided as 18.68 samples/chip, the first 107.52 samples are blanked at the start of the hop by the blanking filter block 22 due to guard time. The number of samples blanked per hop of 107.52 is obtained from the difference between 6384 samples and (18.68 samples/chip)*(336 chips per hop).

Since the blanking filter block 22 and the cyclic shift block 24 are combined into a structure that is constructed of memory devices such as a random-access-memory (RAM), the size of the RAM may correspond to the incoming samples per hop which is calculated as the product of the input sampling rate and the valid symbol time per hop (120 MHz*52.3 $\mu s$=6276 samples). If the incoming samples are complex data samples including both real and imaginary data, and each of which may be 11 bits long, the RAM needs to store approximately 18 Kbytes (6276*11*2=17,259 bytes). The cyclic shift block 24 is used to perform a cyclic shifting of samples of filtered outputs from the blanking filter block 22 in accordance with a predetermined number of shifts. The number of shifts is determined by, for example, (sample number) modulo 16, where sample number is from 0 to 6383. The DFT block 26 may perform 16-point DFT calculations.

Based on these design parameters obtained by the innovative channelizer design methodology of the present invention, the blanking filter block 22 and the cyclic shift block 24 of the 1×orthogonal channelizer 20 contain a plurality of random-access-memory devices (RAM) and serial-to-parallel registers implemented for parallel real and imaginary data operations to obtain a high throughput data rate. Likewise, the discrete Fourier transform (DFT) block 26 contains a plurality of multiplexers (MUXes) and discrete Fourier transform circuits for parallel real and imaginary data operations. Parallel window presum and DFT architecture of the multi-rate orthogonal channelizer 20 according to the present invention provide several advantages, which are particularly useful for satellite communications applications. First, the parallel processing operations of sample blanking and DFT circuits minimizes the speed of an operating clock which advantageously enables efficient deployment of ASIC (application specific integrated circuit) hardware. Second, the power consumption is reduced because inexpensive and compact integrated circuit technologies such as CMOS (complementary MOSFET) may be used for blanking and DFT operations. Lastly, parallel sample blanking and DFT circuits are conveniently packaged in modular forms.

As shown in FIG. 6, the blanking filter block 22 and the cyclic shift block 24 contain a pair of identical 8 K×16 RAMs 210A and 210B and a pair of serial-to-parallel registers 220A and 220B for processing a sequence of 11-bit word input data of conjugate pair of real data and imaginary data. The blanking filter block 22 and the cyclic shift block 24 pass a majority of processed cyclically shifted samples directly to the DFT block 26 while discarding the blanked samples. The first 8 K×16 RAM 210A stores the real data, while the second 8 K×16 RAM 210B stores the imaginary data. Similarly, the first serial-to-parallel register 220A transposes the serial output of real data from the first RAM 210A into parallel outputs of real data, d0r, d1r ... d15r, while the second serial-to-parallel register 220B transposes the serial output of imaginary data from the second RAM 210B into parallel outputs of imaginary data, d0i, d1i ... d15i. The control logic block 400 incorporates blanking and circular shifting when addressing and retrieving input data of a conjugate pair of real and imaginary data.

The DFT block 26 contains pairs of identical multiplexers 240A-240C, 240L-240N, 240D-240G, and 240H-240K for a corresponding conjugate pair of real data 220A, 220B and imaginary data 222A, 222B. In addition, the DFT block 26 may further contain multiple pairs of 4-point DFT modules for a corresponding conjugate pair of real data 260A-260D and imaginary data 262A-262D, two successively combine 4-point DFT modules for a corresponding pair of real data 280A-280B and imaginary data 282A-282B, and a single combine 8-point DFT module for real data 300 and imaginary data 310. Shadow blocks 262A-262D, 282A-282B and 310 contain identical hardware to process the imaginary data. It should be noted here that the number of RAMs, registers, permutes and DFT modules as shown in FIG. 6 is only for illustrative purposes, and may be varied in accordance with parallel processing requirements.

For the 1×mode of operation, all processing hardware blocks, such as the blanking filter block 22, the cyclic shift block 24 and the DFT block 26 are concomitantly used to process both real data and imaginary data in order to produce ten (10) sub-channels with a channel spacing of 7.5 MHz at 1×data rate. However, for different channelization modes, such as 2×and 4×modes of operation as subsequently described in detail, some of these hardware blocks are bypassed because they are not needed. Input control data from the configuration word format is used to inform the multi-rate orthogonal channelizer 20 to automatically process input data (both real and imaginary) in different channelization mode of operation without using some of these hardware blocks.

The parallel outputs from the blanking filter block 22 is applied to the cyclic shift block 24, which phase adjusts the parallel resultant summation for processing into each channel by discrete Fourier transform (DFT) calculations. The cyclic shift block 24 shifts the resultant word outputs from the blanking filter block 22 by a circular shiftl value of (sample number) modulo 16, where sample number is from 0 to 6383 obtained by the innovative channelizer design methodology of the present invention. The phase adjusted outputs from the cyclic shift block 24 are applied to the discrete Fourier transform (DFT) block 26 for transformation into individual channels at 1×data rate. The multiplexers 240A–240N are used to order the data properly for DFT calculations. The control logic block 400 controls the select lines (not shown) to the multiplexers 240A–240N. The input selected is based on the data rate of the output channels. For the 1×data rate the ordering is set up for a 16 point DFT.

The DFT block 26 contains sixteen (16) point complex DFT using, for example, the radix 2 implementation for performing discrete Fourier transform computations. As shown in FIG. 6, there may be four (4) 4-point complex DFT modules for discrete Fourier transform (DFT) computations of real data 260A–260D and imaginary data 262A–262D. Following the 4-point complex DFT modules 260A–260D, 262A–262D are a pair of combine 4-point complex DFT modules 280A–280B, 282A–282B and a single combine 8-point DFT module 300 and 310 for producing ten (10) valid individual channels, channels 0, 1, 2 . . . with a frequency spacing of 7.5 MHz at the 1×data rate.

For the 2×orthogonal channelizer 20, the key input parameters such as an input data (sampling) rate, an input channel group bandwidth, a hop time and a valid symbol time per hop are the same as that of the 1×orthogonal channelizer. For example, the input sampling rate=120 MHz; input channel group bandwidth=80 MHz; hop time=53.2 $\mu$s; and valid symbol time per hop=52.3 $\mu$s. However, the modulation mode is now doubled as 32+640 SDPSK (32 reference chips and 640 data chips per hop). Again, these key parameters are known prior to channelization. Given these key input parameters, the channel spacing, the DFT size, the valid output DFT bins, and the # of samples to blank for each chip can be derived using the innovative channelizer design methodology according to the present invention as follows:

1. Chipping rate = #chips per hop/valid symbol time per hop
   = (32 + 640)/52.3 $\mu$s
   = 12.85 MHz
   = output sampling rate;
1. # samples per chip = input sampling rate/chipping rate
   = 120 MHz/12.85 MHz
   = 9.34 samples/chip;
1. Chip duration = 1/chipping rate
   = 1/12.85 MHz
   = 0.0778 $\mu$s;
1. Desired dead zone loss < 1 dB, so that DFT size must be such that abs(10 log$_{10}$ (DFT size/#samples per chip) < 1 dB which is abs(10 log$_{10}$ (DFT size/9.34) < 1 dB. DFT size must be less than the #samples per chip. Based on the relationship with the dead zone loss, the DFT size chosen is 8 since the 8-point DFT may be readily implemented;
2. Channel spacing = input sampling rate/DFT size
   = 120 MHz/8
   = 15 MHz;
1. Dead zone loss = 10 log$_{10}$ (DFT size/#samples per chip)
   = 10 log$_{10}$ (8/9.34)
   = −0.67 dB;
1. Dead zone = #samples per chip − #samples processed per chip
   = 9.34 − 8
   = 1.34 samples blanked per chip;
1. # valid output channels = input channel group bandwidth/channel spacing
   = 80 MHz/15 MHz
   = 5.33 or approximately 5 valid output channels;
1. # samples per hop = hop time * input sampling rate
   = 53.2 $\mu$s * 120 MHz
   = 6384 samples per hop;
1. Circular shift value = (sample #) modulo (DFT size)
   = (sample #) modulo 8, where sample # is from 0 to 6383.

Each data frame of the 2×modulation mode contains 672 chips per hop including 32 reference chips and 640 data chips. A guard time is provided for data frame separation. Since the hop time is provided as 53.2 $\mu$s and the valid symbol time per hop is provided as 52.3 $\mu$s, the guard time is determined as the difference between the top time and the valid symbol time per hop 53.2 $\mu$s−52.3 $\mu$s=0.9 $\mu$s. Further, since the number of samples per hop is provided as 6384 samples/hop, and the number of samples per chip is provided as 9.34 samples/chip, the same first 107.52 samples is blanked per hop by the blanking filter block 22 due to guard time. The number of samples blanked per hop of 107.52 is obtained from the difference between 6384 samples and (9.34 samples/chip)*(672 chips per hop).

Again, the size of the RAM corresponds to the incoming samples per hop and is calculated as the product of the input sampling rate and the valid symbol time per hop (120 MHz * 52.3 μs=6276 samples). If the incoming samples are complex data samples including both real and imaginary data, and each of which is 11 bits long, the RAM needs to store approximately 18 Kbytes (6276 * 11 * 2=17,259 bytes). The cyclic shift block 24 circularly shifts samples of filtered outputs from the blanking filter block 22 in accordance with a predetermined number of shifts. The number of shifts is determined by, for example, (sample number) modulo 8 (DFT size), where sample number is from 0 to 6383. The DFT block 26 performs 8-point DFT calculations.

Figure 7:
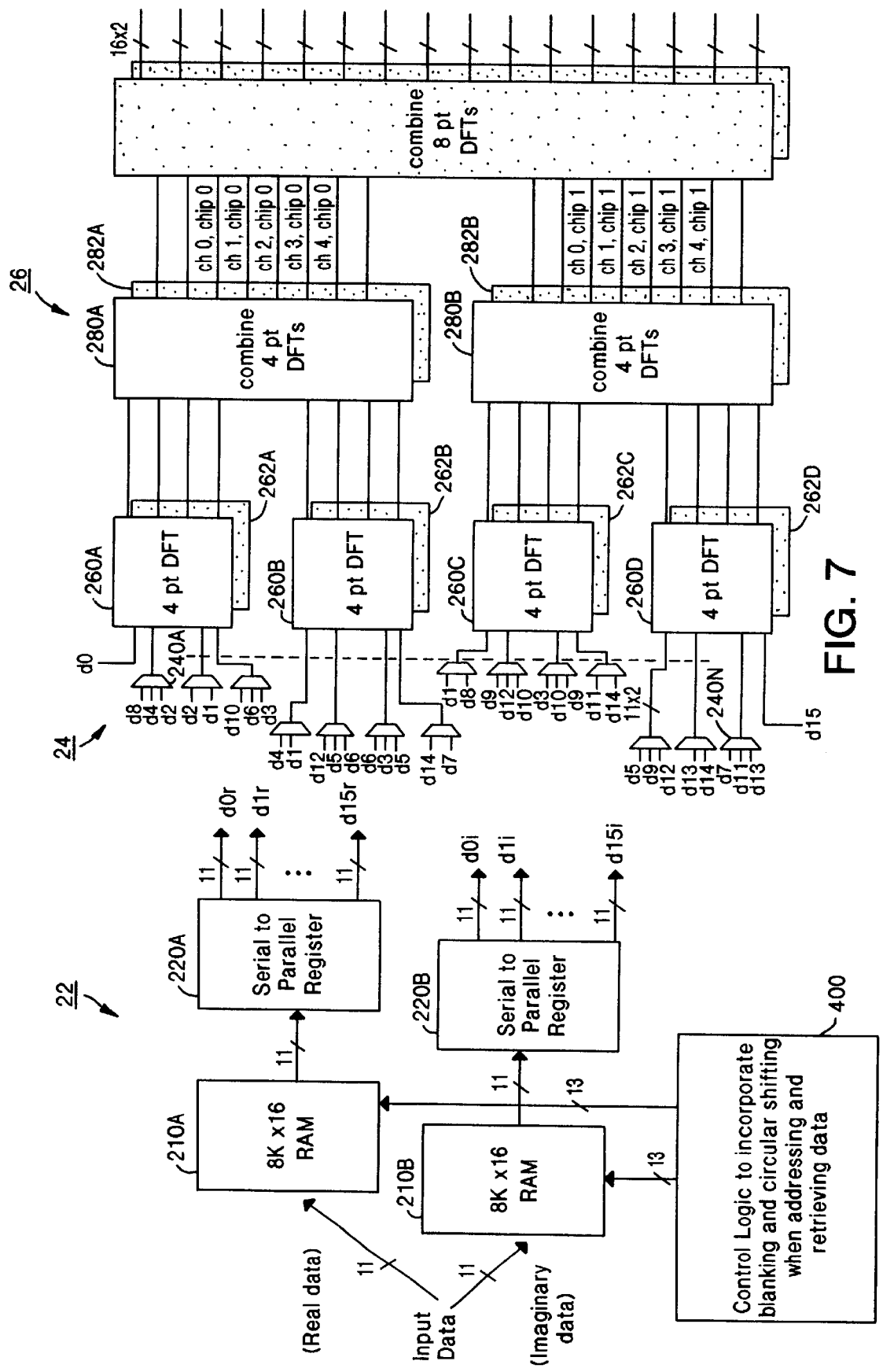
FIG. 7 illustrates a block level diagram of a configurable multi-rate orthogonal channelizer obtained using an innovative channelizer design methodology to separate an input signal into individual channels at 2×data rate according to the principles of the present invention.

Based on these design parameters obtained by the innovative channelizer design methodology of the present invention, the 2×orthogonal channelizer 20 is implemented as shown in FIG. 7 as comprising the same blanking filter block 22, the cyclic shift block 24, and the discrete Fourier transform (DFT) block 26 as required for the 1×data rate. The blanking filter block 22 and the cyclic shift block 24 contain the same 8 K×16 RAMs 210A–210B, the same serial-to-parallel register 220A–220B implemented for parallel real and imaginary data operations to obtain a high throughput data rate and the same control logic block 400.

However, the discrete Fourier transform (DFT) block 26 contains only the multiplexers 240A–240N, the 4-point DFT multiplexers 240A–240N, the 4-point DFT modules 260A–260D and 262A–262D and the pair of combine 4-point DFT modules 280A–280B and 282A–282B of the DFT block 26 as shown in FIG. 7 are concomitantly used to process both real data and imaginary data to produce five (5) sub-channels at 2×data rate. However, the combine 8-point DFT modules 300 and 310 of the DFT block 26 are bypassed.

For the 4×orthogonal channelizer 20, the key input parameters such as an input data (sampling) rate, an input channel group bandwidth, a hop time and a valid symbol time per hop are the same as that of the 1×orthogonal channelizer and the 2×orthogonal channelizer. For example, the input sampling rate=120 MHz; input channel group bandwidth=80 MHz; hop time=53.2 μs; and valid symbol time per hop= 52.3 μs. However, the modulation mode is provided as 64+1280 SDPSK (64 reference chips and 1280 data chips per hop). Again, these key parameters are known prior to channelization. Given these key input parameters, the channel spacing, the DFT size, the valid output DFT bins, and the # of samples to blank for each chip can be derived using the innovative channelizer design methodology according to the present invention as follows:

1. Chipping rate = #chips per hop/valid symbol time per hop
   = (64 + 1280)/52.3 μs
   = 25.698 MHz
   = output sampling rate;
1. # samples per chip    = input sampling rate/chipping rate
   = 120 MHz/25.698 MHz
   = 4.67 samples/chip;
1. Chip duration = 1/chipping rate
   = 1/25.698 MHz
   = 0.0389 μs;
1. Desired dead zone loss < 1 dB, so that DFT size must be such that abs(10 $\log_{10}$ (DFT size/#samples per chip) < 1 dB which is abs(10 $\log_{10}$ (DFT size/4.67) < 1 dB. DFT size must be less than the #samples per chip. Based on the relationship with the dead zone loss, the DFT size chosen is 4 since the 4-point DFT may be readily implemented;
2. Channel spacing    = input sampling rate/DFT size
   = 120 MHz/4
   = 30 MHz;
1. Dead zone loss = 10 $\log_{10}$ (DFT size/#samples per chip)
   = 10 $\log_{10}$ (4/4.67)
   = –0.67 dB;
1. Dead zone = #samples per chip – #samples processed per chip
   = 4.67 – 4
   = 0.67 samples blanked per chip;
1. # valid output channels = input channel group bandwidth/channel spacing
   = 80 MHz/30 MHz
   = 2.67 or approximately 2 valid output channels;
1. # samples per hop = hop time * input sampling rate
   = 53.2 μs * 120 MHz
   = 6384 samples per hop;
1. Circular shift value = (sample #) modulo (DFT size)
   = (sample #) modulo 4, where sample # is from 0 to 6383.

modules 260A–260D and 262A–262D and the pair of combine 4-point DFT modules 280A–280B and 282A–282B for parallel real and imaginary DFT computations. The combine 8-point DFT modules 300 and 310 of the DFT block 26 as required by the 1×channelizer are now bypassed as shaded to produce five (5) channels at 2×data rate. Again, the shadow blocks 262A–262D and 282A–282B contain identical hardware to process the imaginary data. For 2×mode of operation, the processing hardware blocks, such as the blanking filter block 22, the cyclic shift block 24, the Each data frame of the 4×modulation mode contains 1344 chips per hop including 64 reference chips and 1280 data chips. A guard time is provided for data frame separation. since the hop time is provided as 53.2 μs and the valid symbol time per hop is provided as 52.3 μs, the guard time is determined as the difference between the top time and the valid symbol time per hop 53.2 μs–52.3 μs 0.9 μs. Further, since the number of samples per hop is provided as 6384 samples/hop, and the number of samples per chip is provided as 4.67 samples/chip, the same first 107.52 samples is blanked per hop by the blanking filter block 22 due to guard time. The number of samples blanked at the start of the hop of 107.52 is obtained from the difference between 6384 samples and (4.67 samples/chip)*(1344 chips per hop).

Again, the size of the RAM corresponds to the incoming samples per hop and is calculated as the product of the input sampling rate and the valid symbol time per hop (120 MHz*52.3 $\mu$s=6276 samples). If the incoming samples are complex data samples including both real and imaginary data, and each of which is 11 bits long, the RAM needs to store approximately 18 Kbytes (6276*11*2=17,259 bytes). The cyclic shift block 24 circularly shifts samples of filtered outputs from the blanking filter block 22 in accordance with a predetermined number of shifts. The number of shifts is determined by, for example, (sample number) modulo 4 (DFT size), where sample number is from 0 to 6383. The DFT block 26 performs 4-point DFT calculations.

Figure 8:
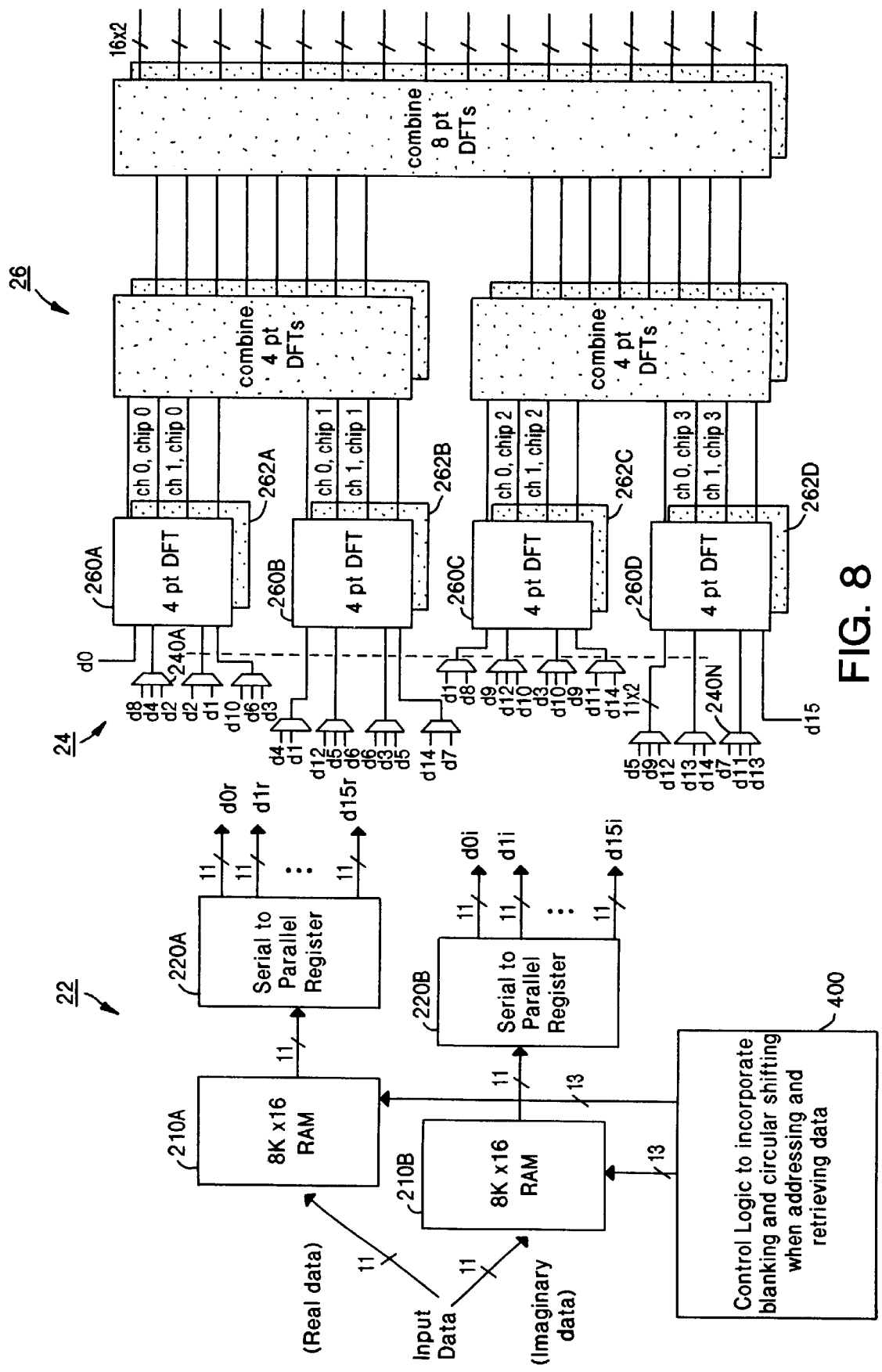
FIG. 8 illustrates a block level diagram of a configurable multi-rate orthogonal channelizer obtained using an innovative channelizer design methodology to separate an input wideband signal into individual channels at 4×data rate according to the principles of the present invention.

Based on these design parameters obtained by the innovative channelizer design methodology of the present invention, the 4×orthogonal channelizer 20 is implemented as shown in FIG. 8 as comprising the same blanking filter block 22, the cyclic shift block 24, and the discrete Fourier transform (DFT) block 26 as required for the 1×data rate. The blanking filter block 22 and the cyclic shift block 24 contain the same 8 K×16 RAMs 210A–210B, the same serial-to-parallel register 220A–220B implemented for parallel real and imaginary data operations to obtain a high throughput data rate, and the same control logic block 400.

However, the discrete Fourier transform (DFT) block 26 contains only the multiplexers 240A–240N, and the 4-point DFT modules 260A–260D and 262A–262D for parallel real and imaginary DFT computations. The pair of combine 4-point DFT modules 280A–280B and 282A–282B and the pair of combine 8-point DFT modules 300 and 310 of the DFT block 26 as required by the 1×channelizer are now bypassed as shaded to produce two (2) sub-channels at 4×data rate. Again, shadow blocks 262 A–262 D contain identical hardware to process the imaginary data. For 4×mode of operation, the processing hardware blocks, such as the blanking filter block 22, the cyclic shift block 24, the multiplexers 240A–240N and the 4-point DFT modules 260A–260D and 262A–262D of the DFT block 26 as shown in FIG. 8 are concomitantly used to process both real data and imaginary data to produce two (2) sub-channels at 4×data rate. However, the combine 4-point DFT modules 280A–280B and 282A–282B and the combine 8-point DFT modules 300 and 310 of the DFT block 26 are bypassed.

As described in the foregoing, the innovative channelizer design methodology according to the present invention is used to advantageously design a specific configurable multi-rate orthogonal channelizer for separating an input signal of an input sampling rate and an input channel group bandwidth into individual channel(s) at different data rates. A single orthogonal channelizer may be used for all three different configurations as demonstrated, for example, in FIGS. 6, 7, and 8. This channelizer design is advantageously configurable with minimal hardware for efficiently servicing multiple input data rates while realizing design hardware savings. In addition, the multi-rate channelizer is implemented with an efficient hardware architecture using parallel sample blanking, cyclic shift and discrete Fourier transform operations to separate an input wideband signal of different channel group bandwidths into individual channel(s) at different data rates. Parallel blanking, cyclic shift and DFT architecture of the multi-rate channelizer according to the present invention provides several advantages for satellite communications applications. For example, the parallel processing operations of blanking, cyclic shift and DFT circuits minimize the speed of an operating clock which advantageously enables efficient deployment of ASIC (application specific integrated circuit) hardware. The power consumption is reduced because inexpensive and compact integrated circuit (IC) technologies such as CMOS (complementary MOSFET) are used for blanking filter, cyclic shift and DFT operations. Lastly, the parallel blanking filter, cyclic shift and DFT circuits are conveniently packaged in modular forms.

While there have been illustrated and described what are considered to be preferred embodiments of the present invention, it will be understood by those skilled in the art that various changes and modifications may be made, and equivalents may be substituted for elements thereof without departing from the true scope of the present invention. For example, while the configurable orthogonal channelizer design may be described for use in satellite systems, the present invention is not limited thereto. Such a configurable multi-rate orthogonal channelizer may be well suited for other types of communications systems such as all current and future cellular and personal communication systems (PCS) which receive electromagnetic radiation within a frequency band containing multiple channels. In addition, other multiples of output data rates such as 8×, 16×, 32× etc. may be suitably produced as long as the input bandwidth may be sufficiently large to support higher multiples of output data rates. Further, many modifications may be made to adapt a particular situation to the teachings of the present invention without departing from the central scope of the present invention. Therefore, it is intended that the present invention not be limited to the particular embodiment disclosed as the best mode contemplated for carrying out the present invention, but that the present invention includes all embodiments falling within the scope of the appended claims.

What is claimed is:

1. A configurable orthogonal channelizer which operates in different modes of channelization to separate an input signal of an input sampling rate and an input channel group bandwidth into individual channel(s) at a different data rate, said orthogonal channelizer comprising:

a blanking filter and cyclic shift block comprising memory devices, control logic, and serial-to-parallel registers, arranged in parallel to receive successive sets of data samples of said input signal, which performs blanking operations in which a predetermined number of data samples on either side of a modulator transition are blanked for guard time to produce blanked sample outputs, and phase shifting operations in accordance with a number of shifts to produce phase adjusted outputs; and a plurality of discrete Fourier transform (DFT) modules, arranged in parallel to receive respective ones of said phase adjusted outputs, which perform discrete Fourier transform (DFT) computations to produce said individual channels at a different data rate.

2. A configurable orthogonal channelizer as claimed in claim 1, wherein said number of shifts of said blanking filter and cyclic shift block is determined by (sample number) *modulo (DFT size), where a sample number begins from zero to the total number samples per hop, and where a hop is a portion of a data frame.

3. A configurable orthogonal channelizer as claimed in claim 1, wherein said blanking filter and cyclic shift block, and said plurality of discrete Fourier transform (DFT) modules are used together to separate said successive sets of said input signal into individual channels with a first spacing of a bandwidth frequency of said input signal at a first data rate, when a selected mode of said channelization corresponds to a first mode set for channelizing said input signal into said individual channels at said first data rate.

4. A configurable orthogonal channelizer as claimed in claim 3, wherein said blanking filter and cyclic shift block, and first selected ones of said plurality of discrete Fourier transform (DFT) modules are used together while all remaining ones of said plurality of discrete Fourier transform (DFT) modules are bypassed to separate said successive sets of said input signal into individual channels with a second spacing of greater than said first spacing of a bandwidth frequency of said input signal at a second data rate, when said selected mode of said channelization corresponds to a second data mode set for channelizing said input signal into said individual channels at said second data rate.

5. A configurable orthogonal channelizer as claimed in claim 4, wherein said blanking filter block and cyclic shift block, and second selected ones different from said first selected ones of said plurality of discrete Fourier transform (DFT) modules are used together while all remaining ones of said plurality of discrete Fourier transform (DFT) modules are bypassed to separate said successive sets of said input signal into individual channels with a third spacing greater than said second spacing of a bandwidth frequency of said input signal at a third data rate, when said selected mode of said channelization corresponds to a third data mode set for channelizing said input signal into said individual channels at said third data rate.

6. A configurable orthogonal channelizer as claimed in claim 1, wherein said different modes of channelization comprise a 1×data rate mode for separating said successive sets of said input signal into a first plurality of individual channels with a channel spacing of a bandwidth frequency of said input signal at the 1×data rate, a 2×data rate mode for separating said successive sets of said input signal into a second plurality of individual channels with a channel spacing of twice the bandwidth frequency of said input signal at the 2×data rate, and a 4×data rate mode for separating said successive sets of said input signal into a third plurality of individual channels with a channel spacing four times the bandwidth frequency of said input signal at the 4×data rate.

7. A configurable orthogonal channelizer as claimed in claim 6, wherein said blanking filter and cyclic shift block and said discrete Fourier transform (DFT) modules operate together to channelize said successive sets of said input signal into said first plurality of individual channels as parallel outputs at the 1×data rate, when a selected mode of channelization corresponds to said 1×data rate mode.

8. A configurable orthogonal channelizer as claimed in claim 1, wherein said blanking filter and cyclic shift block comprises:
a first memory device which receives a sequence of real data for sample processing;
a second memory device which receives a sequence of imaginary data for sample processing;
a first serial-to-parallel register which passes cyclically shifted processed samples of real data from said first memory device as parallel sample outputs while discarding blanked samples; a second serial-to-parallel register which passes cyclically shifted processed samples of imaginary data from said second memory device as parallel sample outputs while discarding blanked samples; and
a control logic block which incorporates blanking and cyclic shifting when addressing and retrieving real and imaginary data input from said first and second memory devices respectively.

9. A configurable orthogonal channelizer as claimed in claim 8, wherein said blanking filter and cyclic shift block performs phase shift operations in accordance with said number of shifts to produce phase adjusted outputs of said real data and said imaginary data.

10. A configurable orthogonal channelizer as claimed in claim 9, wherein said plurality of discrete Fourier transform (DFT) modules comprises:
first multiplexers, arranged in parallel to receive respective ones of said phase adjusted outputs of said real and imaginary data, which order the data properly for DFT calculations;
first 4-point discrete Fourier transform (DFT) units, arranged to receive respective ones of said phase adjusted outputs of said real data, which perform 4-point transformations to produce first transform outputs of complex data;
second 4-point discrete Fourier transform (DFT) units, arranged to receive respective ones of said phase adjusted outputs of said imaginary data, which perform said 4-point transformations to produce second transform outputs of said complex data;
first combine 4-point discrete Fourier transform (DFT) units, arranged to receive respective ones of said first transform outputs of said complex data, which combine 4-point transformations to produce first combined outputs of said complex data;
second combine 4-point discrete Fourier transform (DFT) units, arranged to receive respective ones of said second transform outputs of said complex data, which combine said 4-point transformations to produce second combined outputs of said complex data; and
combine 8-point discrete Fourier transform (DFT) units, arranged to receive said first and second combined outputs of said complex data to produce said individual channels of interest.

11. A configurable orthogonal channelizer as claimed in claim 10, wherein said blanking filter and cyclic shift block, the multiplexers, first and second 4-point discrete Fourier transform (DFT) units and the first and second combine 4-point discrete Fourier transform (DFT) units of said discrete Fourier transform (DFT) modules are used together, while the combine 8-point discrete Fourier transform (DFT) units of said plurality of discrete Fourier transform (DFT) modules are bypassed to separate said successive sets of said input signal into said second plurality of individual channels as parallel outputs at the 2×data rate, when a selected mode of channelization corresponds to said 2×data rate mode.

12. A configurable orthogonal channelizer as claimed in claim 10, wherein said blanking filter and cyclic shift block, the multiplexers, and the first and second 4-point discrete Fourier transform (DFT) units of said discrete Fourier transform (DFT) modules are used together, while the first and second combine 4-point discrete Fourier transform (DFT) units and the combine 8-point discrete Fourier transform (DFT) of said discrete Fourier transform (DFT) modules are bypassed to separate said successive sets of said input signal into said third plurality of individual channels as parallel outputs at the 4×data rate, when a selected mode of channelization corresponds to said 4×data rate mode.

13. A receiving station for wireless communication network containing multiple communication channels, comprising:
a radio-frequency processor which intercepts electromagnetic radiation within a frequency band and converts the intercepted electromagnetic radiation into a composite signal containing multiple communication channels;

a converter which converts said composite signal containing multiple communication channels into a digitized signal containing successive sets of data samples representative of said composite signal;

a demultiplexer which divides said digitized signal into parallel data streams of successive sets of data samples;

at least one orthogonal channelizer comprising a blanking filter and cyclic shift block and a discrete Fourier transform (DFT) block, which blanks selected samples of said digitized signal for guard time and performs phase shift operations and discrete Fourier transform (DFT) computations in different modes of channelization for separating said parallel data streams of successive sets of data samples of said digitized signal to produce individual channels at a different data rate in dependence upon a selected mode of channelization; and at least one signal processor which processes respective individual channels produced from said channelizer and supplies processed ones of said individual channels at respective output ports.

14. A receiving station as claimed in claim 13, wherein said orthogonal channelizer comprises:

a control logic block and a plurality of memory devices and serial-to-parallel registers, arranged in parallel to receive successive sets of data samples of said input signal, which performs blanking operations and cyclic shifting in which a predetermined number of data samples on either side of a modulator transition are blanked for guard time, and phase shifted in accordance with a number of shifts to produce phase adjusted outputs; and a plurality of discrete Fourier transform (DFT) modules, arranged in parallel to receive respective ones of said phase adjusted outputs, which perform said discrete Fourier transform (DFT) computations to produce said individual channels at a different data rate.

15. A receiving station as claimed in claim 14, wherein said number of shifts of said control logic block and said plurality of memory devices and serial-to-parallel registers are determined by (sample number)*modulo (DFT size), where a sample number begins from zero to the total number samples per hop, and where a hop is a portion of a data frame.

16. A receiving station as claimed in claim 15, wherein said different data rate is set by a different mode of channelization including a 1×data rate mode for separating said successive sets of data samples of said digitized signal into a first plurality of individual channels with a channel spacing of a bandwidth frequency of said digitized signal at the 1×data rate, a 2×data rate mode for separating said successive sets of data samples of said digitized signal into a second plurality of individual channels with a channel spacing of twice the bandwidth frequency of said digitized signal at the 2×data rate, and a 4×data rate mode for separating said successive sets of data samples of said digitized signal into a third plurality of individual channels with a channel spacing four times the bandwidth frequency of said digitized signal at the 4×data rate.

17. A receiving station as claimed in claim 16, wherein said orthogonal channelizer operates to channelize said successive sets of data samples of said: digitized signal into said first plurality of individual channels as parallel outputs at the 1×data rate using said sample blanking operations, said cyclic shift operations, and said discrete Fourier transform (DFT) computations, when said selected mode of channelization corresponds to said 1×data rate mode.

18. A receiving station as claimed in claim 16, wherein said orthogonal channelizer operates to channelize said successive sets of data samples of said digitized signal into said second plurality of individual channels as parallel outputs at the 2×data rate using said sample blanking operations, said cyclic shift operations, and said discrete Fourier transform (DFT) computations, when said selected mode of channelization corresponds to said 2×data rate mode.

19. A receiving station as claimed in claim 16, wherein said blanking filter and cyclic shift block of the orthogonal channelizer comprises:

a first memory device which receives a sequence of real data for sample processing;

a second memory device which receives a sequence of imaginary data for sample processing;

a first serial-to-parallel register which passes processed cyclically shifted samples of real data from said first memory device as parallel sample outputs while discarding blanked samples;

a second serial-to-parallel register which passes processed cyclically shifted samples of imaginary data from said second memory device as parallel sample outputs, while discarding blanked samples; and a control logic block which incorporates blanking and cyclic shifting when addressing and retrieving real and imaginary data input from said first and second memory devices respectively.

20. A receiving station as claimed in claim 16, wherein said blanking filter and cyclic shift block of the orthogonal channelizer performs phase shift operations in accordance with said number of shifts to produce phase adjusted outputs of said real data and said imaginary data.

21. A receiving station as claimed in claim 20, wherein said discrete Fourier transform (DFT) block of the orthogonal channelizer comprises:

a plurality of multiplexers, arranged in parallel to receive respective ones of said phase adjusted outputs of said real and imaginary data, which order the data properly for DFT calculations;

first 4-point discrete Fourier transform (DFT) units, arranged to receive respective ones of said phase adjusted outputs of said real data, which perform 4-point transformations to produce first transform outputs of said complex data;

second 4-point discrete Fourier transform (DFT) units, arranged to receive respective ones of said phase adjusted outputs of said imaginary data, which perform said 4-point transformations to produce second transform outputs of said complex data;

first combine 4-point discrete Fourier transform (DFT) units, arranged to receive respective ones of said first transform outputs of said complex data, which combine 4-point transformations to produce first combined outputs of said complex data;

second combine 4-point discrete Fourier transform (DFT) units, arranged to receive respective ones of said second transform outputs of said complex data, which combine said 4-point transformations to produce second combined outputs of said complex data; and combine 8-point discrete Fourier transform (DFT) units, arranged to receive said first and second combined outputs of said complex data to produce said individual channels of interest.

22. A receiving station as claimed in claim 21, wherein said blanking filter and cyclic shift block, the multiplexers, the first and second 4-point discrete Fourier transform (DFT) units and the first and second combine 4-point discrete Fourier transform (DFT) units of said discrete Fourier transform (DFT) block of the orthogonal channelizer are used together, while the combine 8-point discrete Fourier transform (DFT) units of said plurality of discrete Fourier transform (DFT) block are bypassed to separate said successive sets of said input signal into said second plurality of individual channels as parallel outputs at the 2×data rate, when a selected mode of channelization corresponds to said 2×data rate mode.

23. A receiving station as claimed in claim 22, wherein said blanking filter and cyclic shift block, and the first and second 4-point discrete Fourier transform (DFT) units of said discrete Fourier transform (DFT) block of the orthogonal channelizer are used together, while the first and second combine 4-point discrete Fourier transform (DFT) units and the combine 8-point discrete Fourier transform (DFT) of said discrete Fourier transform (DFT) block are bypassed to separate said successive sets of said input signal into said third plurality of individual channels as parallel outputs at the 4×data rate, when a selected mode of channelization corresponds to said 4×data rate mode.

24. A method of designing a single orthogonal channelizer for channelizing an input signal of an input spectrum into individual channels for output at a different data rate, comprising:

obtaining information relating to an input sampling rate, an input channel group bandwidth, a number chips per hop which varies in accordance with a modulation mode, a hop time and a valid symbol time per hop of said input signal;

calculating an output sampling rate of said input signal based on the number chips per hop and the valid symbol time per hop;

calculating a number samples per chip based on the input sampling rate and the output sampling rate, and a number samples per hop based on the input sampling rate and the hop time, respectively;

determining a discrete Fourier transform (DFT) size less than the number samples per chip;

calculating a channel spacing of said input signal based on the input sampling rate and the discrete Fourier transform (DFT) size;

determining a number of valid output channels of said input signal based on the input channel group bandwidth and the channel spacing;

determining a number of data samples of said input signal and which data samples are to be blanked on either side of a chip boundary based on the number samples per hop and the number chips per hop; and determining a circular shift value based on the sample number modulo, the discrete Fourier transform (DFT) size, where the sample number is from zero to the number samples per hop minus one.

25. A method as claimed in claim 24, wherein the number of data samples of said input signal to be blanked, the circular shift value, and the discrete Fourier transform (DFT) size are used to construct said single orthogonal channelizer comprising a blanking filter and cyclic shift block which performs sample blanking operations in accordance with the number of data samples of said input signal to be blanked and phase shifting operations in accordance with the circular shift value, and a discrete Fourier transform (DFT) block which performs discrete Fourier transform (DFT) computations in accordance with the DFT size.

26. A method as claimed in claim 25, wherein said single orthogonal channelizer is configurable to separate data samples of said input signal into a first plurality of individual channel(s) with a spacing of a bandwidth frequency of said input signal at a first data rate using said sample blanking operations, cyclic shift operations and discrete Fourier transform (DFT) computations, when a selected mode of channelization corresponds to the first data rate.

27. A method as claimed in claim 26, wherein said single orthogonal channelizer is configurable to separate data samples of said input signal into a second plurality of individual channel(s) with a spacing of twice a bandwidth frequency of said input signal at a second data rate using said sample blanking operations, cyclic shift operations and selected discrete Fourier transform (DFT) computations, when a selected mode of channelization corresponds to the second data rate.

28. A method as claimed in claim 27, wherein said single orthogonal channelizer is configurable to separate data samples of said input signal into a third plurality of individual channel(s) with a spacing of four times a bandwidth frequency of said input signal at a third data rate using said sample blanking operations, cyclic shift operations and selected discrete Fourier transform (DFT) computations, when a selected mode of channelization corresponds to the third data rate.

29. A method as claimed in claim 25, wherein said single orthogonal channelizer separates said input signal into individual channels for output at said different data rate by:

receiving in parallel different ones of said successive sets of real and imaginary data samples of said input signal for said sample blanking and phase shifting operations in accordance with the number of data samples of said input signal determined to be blanked and the circular shift value to produce parallel blanked and phase adjusted sample outputs; and receiving in parallel respective ones of said blanked and phase adjusted sample outputs for discrete Fourier transform (DFT) calculations to produce transformed baseband outputs representative of said individual channels of interest.

30. A method as claimed in claim 25, further comprised of determining the size of memory devices of said blanking filter and cyclic shift block of the single orthogonal channelizer based on the product of the input sampling rate and the valid symbol time per hop, and the number of bits per data sample for each of real and imaginary data of said input signal.

* * * * *